United States Patent
Silverstein

(10) Patent No.: US 8,543,788 B2
(45) Date of Patent: Sep. 24, 2013

(54) CONFORMAL ROLLING BUFFER APPARATUS, SYSTEMS, AND METHODS

(75) Inventor: Amnon Silverstein, Mountain View, CA (US)

(73) Assignee: Aptina Imaging Corporation, George Town (KY)

( * ) Notice: Subject to any disclaimer, the term of this patent is extended or adjusted under 35 U.S.C. 154(b) by 1629 days.

(21) Appl. No.: 11/758,801

(22) Filed: Jun. 6, 2007

(65) Prior Publication Data
US 2008/0307186 A1   Dec. 11, 2008

(51) Int. Cl.
*G06F 12/00*  (2006.01)
*H04N 5/76*   (2006.01)

(52) U.S. Cl.
USPC ............................ 711/170; 382/173; 345/647

(58) Field of Classification Search
None
See application file for complete search history.

(56) References Cited

U.S. PATENT DOCUMENTS

| | | | | |
|---|---|---|---|---|
| 5,185,667 A * | 2/1993 | Zimmermann | ........... | 348/207.99 |
| 5,231,673 A * | 7/1993 | Elenga | ........... | 382/132 |
| 5,355,165 A * | 10/1994 | Kosonocky et al. | ........... | 348/311 |
| 5,625,709 A * | 4/1997 | Kasdan | ........... | 382/203 |
| 5,818,527 A * | 10/1998 | Yamaguchi et al. | ........... | 348/335 |
| 6,369,818 B1 | 4/2002 | Hoffman et al. | | |
| 6,426,771 B1 * | 7/2002 | Kosugi | ........... | 348/222.1 |
| 6,671,049 B1 * | 12/2003 | Silver | ........... | 356/401 |
| 6,924,832 B1 | 8/2005 | Shiffer et al. | | |
| 2001/0054744 A1 * | 12/2001 | Scott-Thomas | ........... | 257/443 |
| 2004/0179100 A1 * | 9/2004 | Ueyama | ........... | 348/152 |

\* cited by examiner

*Primary Examiner* — Sheng-Jen Tsai
*Assistant Examiner* — Ramon A Mercado
(74) *Attorney, Agent, or Firm* — Kendall P. Woodruff

(57) ABSTRACT

Methods, apparatus, and systems may operate to more efficiently utilize data stored in an array of storage blocks organized as rows and columns of contiguous blocks, where non-linearity is present in the data. Activities may include organizing data to discard useless elements from storage blocks when transferring the data to a memory buffer, and perhaps compressing the data for increased memory density utilization. Additional activities may include reconstructing data stored in the memory buffer and using an image distortion formula to display a linear representation of the non-linear data.

28 Claims, 7 Drawing Sheets

US 8,543,788 B2

CONFORMAL ROLLING BUFFER APPARATUS, SYSTEMS, AND METHODS

TECHNICAL FIELD

This disclosure relates generally to imaging devices, including apparatus, systems, and methods for image distortion correction in an imaging device.

BACKGROUND

Imaging devices include photosensors which may form a part of a semiconductor integrated circuit used in a computer or other electronic devices. There are many different types of semiconductor-based imaging devices, including charge coupled devices (CCDs), photodiode arrays, charge injection devices and hybrid focal plane arrays. Because imaging technology provides large arrays of small pixels (high resolution), imaging devices of ever-decreasing size may be useful for recording images where installation space is limited.

Image sensors used with a wide-angle viewing lens (e.g., fish-eye lens) can collect data in a non-linear fashion, perhaps providing a non-rectilinear data representation within a storage block of sensors. The resulting warped image may then be transformed to a rectilinear representation upon transfer of the data to memory. Prior methods to accomplish the transfer include collecting multiple two dimensional sections of the sensor storage blocks and transferring them to memory buffers of equal size. A non-rectilinear conversion formula would then be applied to each buffer to correct the non-linearity and reconstruct the image. This technique places a burden on the available buffer space, and generally lends to the use of external memory. Thus, there is a need to improve the efficiency of memory use, including the management of buffer memory, when images are processed.

DETAILED DESCRIPTION

Some of the disclosed embodiments operate to transfer sensor data from an array of storage blocks to a plurality of memory cells of a memory device, correcting non-linearity that may have been introduced between different storage blocks within the array as the transfer occurs. For example, a memory allocation request may be received from a processor configured to manage memory devices organized as a plurality of memory cells. According to various embodiments, some of the memory cells may provide data compression.

An array of storage blocks having a known non-linearity can utilize an integral formula, based upon the non-linearity, to calculate a memory index. The memory index can be used to identify the location of the data for each storage block within a memory buffer by associating an x, y coordinate with each storage block within the array. One method to accomplish this mapping may include utilizing Newton's method of divided differences. Readers that would like to know more about Newton's Method of divided differences are encouraged to refer to "Numerical Analysis Using MATLAB® and Excel®," Steven T. Karris, pp 7-42, Third Edition, 2007. As a result, the non-linearity may be addressed during the transfer of data to memory, by establishing new x', y' coordinates for each storage block. This mechanism can sometimes reduce the burden placed upon the memory buffer by eliminating the need to perform post-processing. To reconstruct the data from the memory buffer, the new x', y' coordinates can then be used to recalculate the array x, y coordinates, based upon the integral formula previously established. This can then be used to determine the memory index for each storage block to be read from memory. By further providing data compression during the data storage process, the required buffer memory space may be reduced even further.

Figure 1:
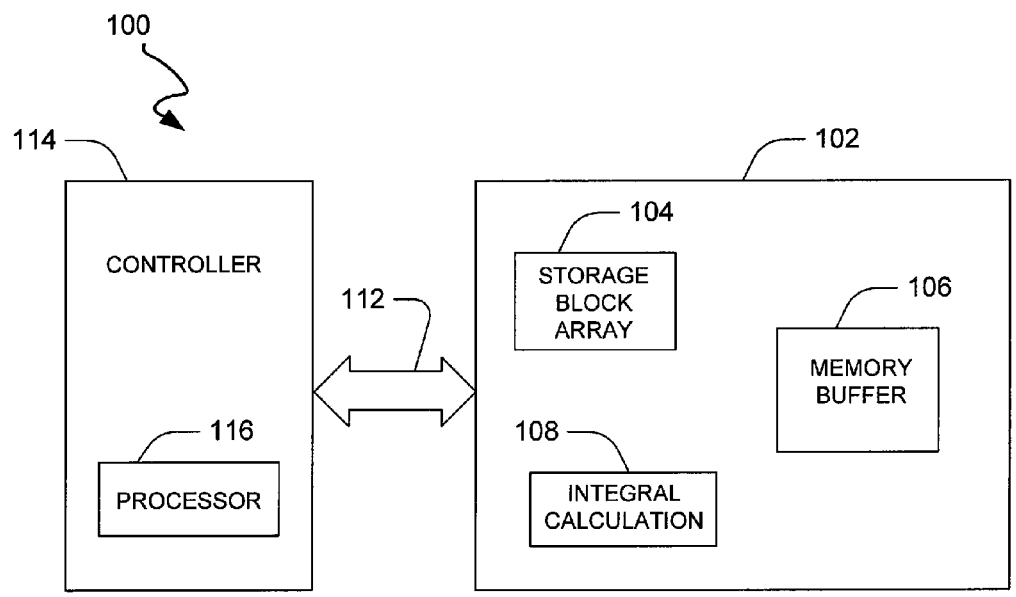
FIG. 1 illustrates a data storage system, including a memory buffer, according to various embodiments of the invention.

FIG. 1 illustrates a data storage system 100, including a memory buffer 106, according to various embodiments of the invention. A data storage system 100 includes an integrated circuit 102 comprising an array 104 of data storage blocks. The integrated circuit 102 may be configured to include a memory buffer 106, and an integral calculator 108, which may include a non-linearity correction formula corresponding to the storage block 104. The memory buffer 106 may contain a compression buffer (not shown) to increase data density storage.

The data storage system 100 may include a memory controller 114, which in turn may include a processor 116. The processor 116 may utilize control lines 112 to communicate with the array 104 via integrated circuit 102. Access to the array 104 may be accomplished by using one or more specified memory cells within the memory buffer 106, linked by addressing via the control lines 112. When access to one or more storage blocks contained within the array 104 is established by the processor 116, data may be written to or read from the specified memory cells. When an allocation request associated with a read request is sent by the processor 116, such an operation may include accessing multiple portions of data, and the integral calculator 108 can provide location identification of related data contained within the memory buffer 106.

Figure 2:
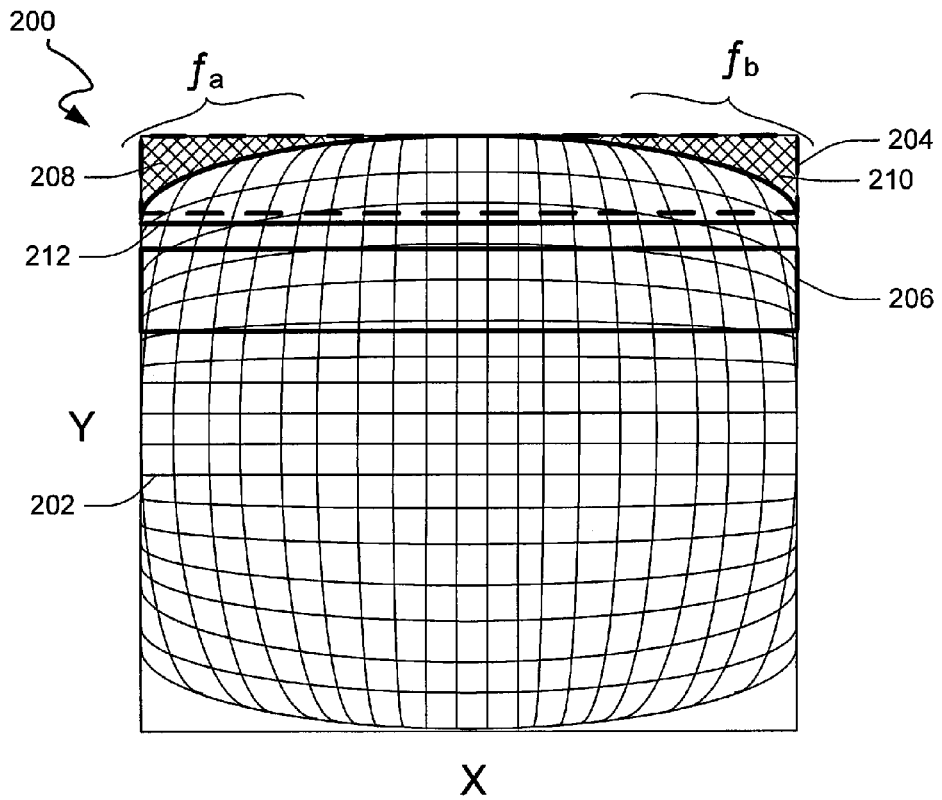
FIG. 2 illustrates a block of sensor data that utilizes a conformal rolling buffer to index data within a memory space, according to various embodiments of the invention.

FIG. 2 illustrates a block of sensor data that utilizes a conformal rolling buffer to index data within a memory space, according to various embodiments of the invention. A storage array 200 arranged as a plurality of storage blocks 202 is shown. Upon receiving an allocation request from a memory controller, and using prior art methods, the first portion 204 bordered in dashed lines, representing a two dimensional area equal to a memory buffer space, may be selected for storing data from a portion of the array 200. The upper left and right corners of the first portion 204 contain unused data areas 208 and 210 falling outside the grid of storage blocks 202. Including the entire first portion 204 constitutes an inefficient use of memory space when the data is transferred to memory, due to the fixed area calculation supplied by the rolling buffer index formula (1), where array data specified on the left side of the formula is stored in the memory location indicated on the right side of the formula:

$$F(x, y) = \mod\left(\sum_{v=0}^{y} W(v), b\right) \quad (1)$$

$$W(v) = \begin{cases} w & \text{if } v < y \\ x & \text{if } v = y \end{cases}$$

where (x,y) is the resulting Cartesian data source coordinates within the array 200, (w) is the buffer length and (b) is the buffer height, and (v) is the memory address offset. The second portion 206 contains an area equal to that of the first portion 204 taken from a separate part or portion of the storage array 200. The use of formula (1) can be repeated for second portion 206 and each subsequent portion of the array 200 until the entire array 200 is indexed to the memory buffer space. The size of each portion (e.g., first and second portions) may be equal in size to the buffer space allocated to store the data from those storage blocks.

Alternatively, using the apparatus, systems, and methods described herein, the unused data areas 208 and 210 may be left out of the data transfer process to more efficiently utilize memory space. The unused data areas 208 and 210 reside outside the boundary region of the storage array 200, such that the boundary region represents data areas to be indexed and transferred to memory space. Upon receiving an allocation request from a memory controller, instead of the first portion 204, the third portion 212 outlined in solid lines, representing a two dimensional area equal to a memory buffer space, is selected for storing a portion of the storage array 200. Although the area of the third portion 212 is similar to that of the first portion 204, the third portion 212 is different in that it includes only the used data among storage blocks 202. The area represented by $f_a$ identifies a changing slope to represent the y coordinate on the upper left side and, similarly, $f_b$ identifies a changing slope that represents the y coordinate on the upper right side. Using an indexing formula that accommodates these elements can reduce the amount of useless data that is stored, such as that included in unused data areas 208 and 210, increasing the amount of buffer space available to store useful data. One such indexing formula, formula (2), is:

$$f(x, y) = \mod\left(\sum_{v=0}^{y} W(v), b\right) \quad (2)$$

$$W(v) = \begin{cases} F_b(v) - F_a(v) & \text{if } v < y \\ x - F_a(v) & \text{if } v = y \end{cases}$$

Where (x,y) is the resulting Cartesian data source coordinates, (w) is the buffer length and (b) is the buffer height, $f_a$ is a function bounded by the left side of the storage array 200 and $f_b$ is a function bounded by the right side of the storage array 200. The next area selected, fourth portion 206, also selects only the useful data within the area bound by $f_a$ and $f_b$ along the x and y axes. Thus, to conserve memory, formula (2) is repeated for second portion 206 and each subsequent portion of the storage array 200 until the entire storage array 200 is indexed to the memory buffer space. As a result, when additional portions are selected as part of the process of storing the data, the buffer space used may be reduced sufficiently to eliminate the need for external memory.

Figure 3:
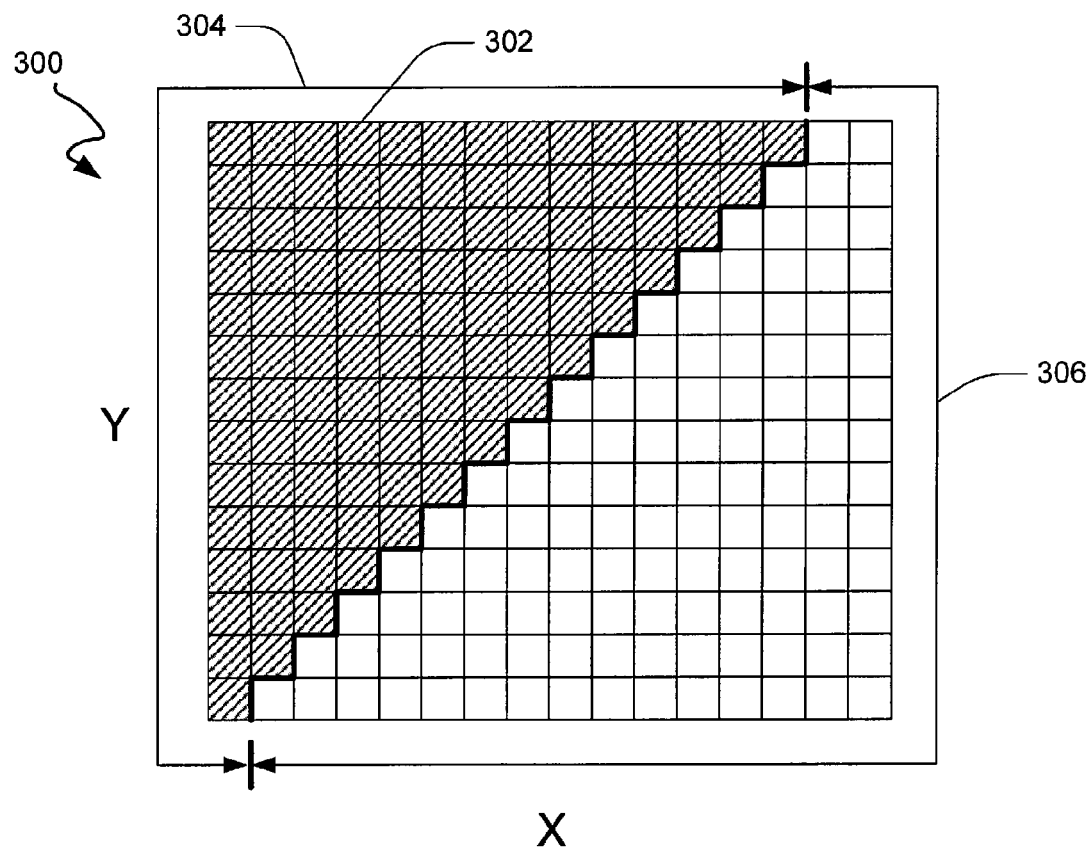
FIG. 3 illustrates an array of sensor data using an indexing formula, according to various embodiments of the invention.

FIG. 3 illustrates an array of sensor data using an indexing formula, according to various embodiments of the invention. Storage array 300 is organized as a plurality of storage blocks 302 which may comprise both a boundary region 304 and a non-boundary region 306. The boundary region 304 may have a non-rectangular or arbitrary shape represented by the shaded portion of storage array 300 and contain useful data to be transferred to memory. The non-boundary region 306 may represent unused data which does not need to be transferred to memory. The boundary region 304 may be specified and fixed such that the memory mapping formula may ignore the non-boundary region 306 during mapping and data transfer. In certain examples, random retrieval of a given storage block 302 (e.g., from a selected x,y location) that has been stored in memory may be desired, thus an indexing formula may allow discrete retrieval. To further illustrate the difference, a storage block 302, located at address A(x,y), may be identified in a rectangular grid having a width w and the index formula, formula (3), is:

$$A(x,y) = wy + x \quad (3)$$

Using a non-rectangular boundary region 304, formula (3) may contain wasted storage space as it is bound to a rectangular index region. In contrast, an indexing formula may be implemented to convert the Cartesian coordinates (x,y) of a storage block 302 to a memory address based on the order in which that storage block 302 was added to memory in a simpler form A(x,y)=i, where i represents the desired storage block 302. According to various embodiments, the storage blocks 302 may be stored in memory locations in a sequential order of increasing x and y positions. A formula, formula (4), may be used to index each storage block 302 of the storage array 300 by sequentially reading each pixel and identifying those which are in the boundary region 304 and those which are part of the non-boundary region 306 as follows:

$$A(x, y) = \sum_{u=0}^{x} \sum_{v=0}^{y} f(u, v) \quad \text{where} \quad (4)$$

$$f(u, v) = \begin{cases} 0 & u, v \text{ outside region} \\ 1 & u, v \text{ inside region} \end{cases}$$

The boundary region 304 may be described as bounded by polynomials such as the triangle-shaped portion shown in FIG. 3. The sums shown in formula (4) may be expressed as polynomial equations where the boundary b includes one side between b(y)=0 and b(y)=y.

In order to store y complete rows of the boundary region 304, an area formula, formula (5), may be applied as:

$$A(y) = \frac{1}{2}y^2 + \frac{1}{2}y \quad (5)$$

Any partially filled rows to be included may be added to the above expression as shown in formula (6) as:

$$A(x, y) = \frac{1}{2}(y - 1)^2 + \frac{1}{2}(y - 1) + x \quad (6)$$

For example, the storage block 302 at location x=3 and y=7 should be stored in address 24 by applying formula (6). Similarly, any region of storage array 300 that is bounded by polynomials may utilize an indexing function that is the integral of that bound area, where the integral may be a polynomial equation. Additionally, as discussed above, Newton's Method of divided differences can be used to more quickly calculate the index if we are incrementing a coordinate by one. Using the example above in which we determined that $A(3,7)=24$, we can simplify the determination of the next index when a difference in y is increased by 7 (dy=7), by using Newton's Method in a $2^{nd}$ order polynomial equation, formula (7), as follows:

$$A(x,y+1)=A(x,y)+dy=24+7=31 \quad (7)$$

Similarly, using formula (8), for a difference in x:

$$A(x+1,y)=A(x,y)+1 \quad (8)$$

Thus, when data storage or retrieval needs sequential increments or decrements, the address lookup may only use a few addition operations, which may be less taxing on processing and memory.

In certain embodiments, the indexing function may be monotonic, such as "first in first out" (FIFO) order of retrieval. The indexing formula can benefit from a rolling buffer having a buffer size n and the indexing will overwrite itself sequentially, when the end of the buffer is reached. This can be illustrated using formula, formula (9), as:

$$((A(x,y)-1) \bmod n)+1 \quad (9)$$

For example, if data enters storage array 300 in left to right, bottom to top order and the user wishes to buffer boundary region 304, the buffer size needs to be determined. For this example we can select a buffer size large enough to contain no more than the three largest rows of storage blocks 302, at the top of the boundary, n=39 and use formula (10), by combining formulas (9) and (6) as follows:

$$A(x, y) = \left(\left(\frac{1}{2}(y-1)^2 + \frac{1}{2}(y-1) + x - 1\right) \bmod n\right) + 1 \quad (10)$$

The index for the storage block 302 at location x=3 and y=7 would be address 24 by applying formula (10). Upon reaching the $40^{th}$ storage element, exceeding the boundary by one, storage block 302 at location x=4 and y=9 would be address 1. At this position, the buffer wraps back around to the first address and overwrites the address of x=1 and y=1. This exceeds the buffer size (n=39) and may assume that the data at x=1 and y=1 is no longer needed.

Figure 4:
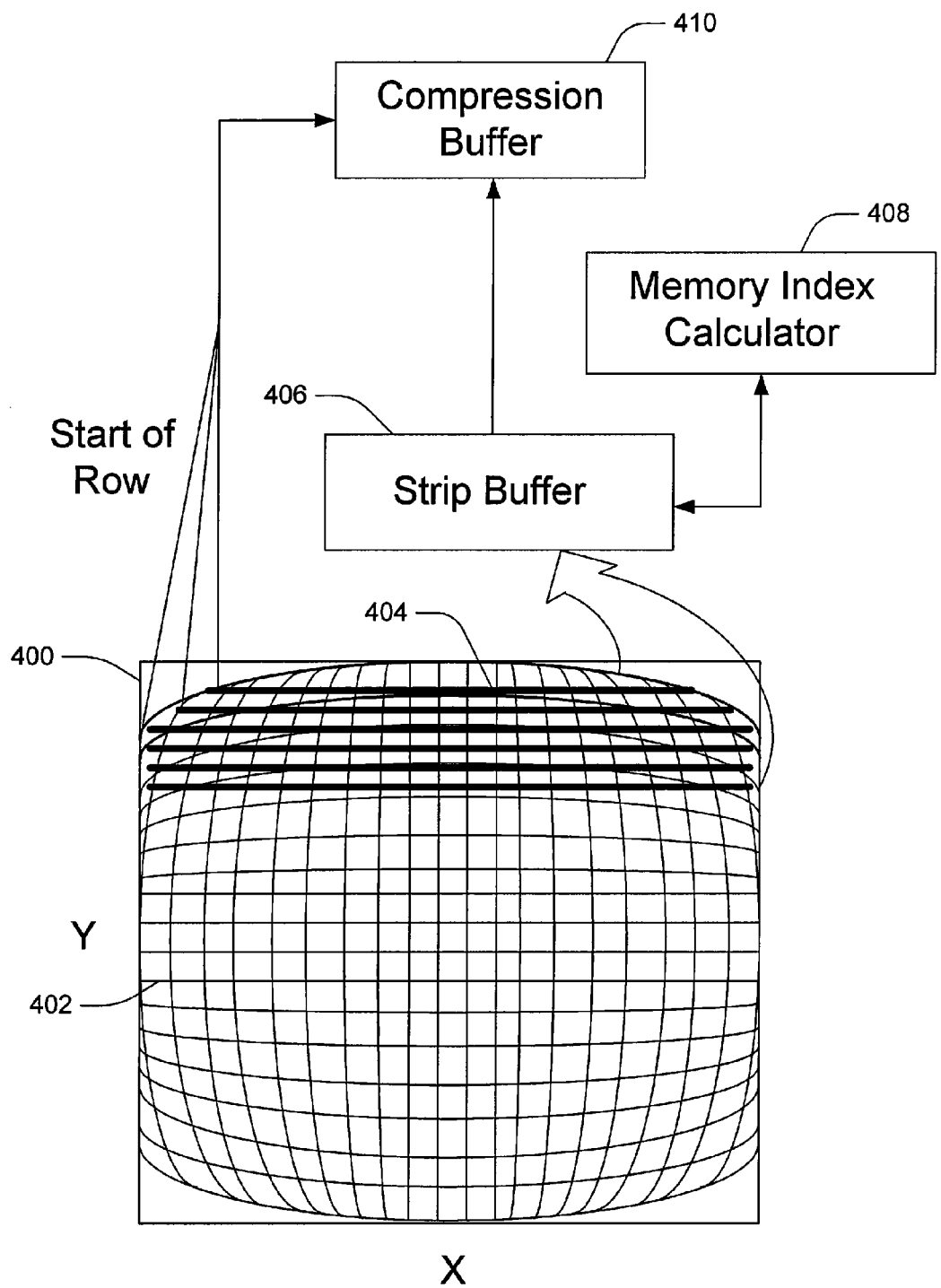
FIG. 4 shows an image sensor module of data pixels organized in rows and columns containing data to be transferred to a memory buffer and compressed, according to various embodiments of the invention.

FIG. 4 shows an image sensor module 400 of data pixels 402 organized in rows and columns containing data to be transferred to a memory buffer and compressed, according to various embodiments of the invention. The module 400 may be similar to or identical to the array 200 of FIG. 2. Each row may contain a start of row index to uniquely identify it from the rest of the rows. Additionally, the start of row index can be used to indicate the first useful data pixel on that row, after any unused pixels.

Each data pixel 402 contained within the module 400 may be represented by a unique distortion formula based upon a known nonlinearity among consecutive pixels. According to various embodiments of the invention, such a known distortion can arise where the image sensor module 400 obtains data from a wide angle lens as part of an imaging system, such as a camera. The known curvature of the lens, such as a fish eye lens, may be established and incorporated as part of an imaging system such that a given portion of the lens can be mapped to a particular data pixel 402 within the sensor module 400.

Upon receiving a memory allocation request from a memory controller, the module 400 may be searched from the top to the bottom, and from left to right, until a start of row index is identified. The memory allocation request may occur after the completion of an image integration time period. The data from an entire row may then be read starting from the start of row index until an end of row and subsequently written to a strip buffer 406. The strip buffer 406 may represent a limited portion of memory cells for temporary storage until long-term memory can be allocated within a memory buffer. In some embodiments, the strip buffer 406 contains sufficient space for eight rows of data pixel information. The memory index calculator 408 may then operate to calculate the memory location for the eight rows of pixel data to associate each block of data with a block of memory. Once the strip buffer 406 is filled, the eight rows in the strip buffer 406 are compressed using any of numerous compression techniques, including industry standard compression techniques, such as JPEG (joint pictures expert group) techniques, and stored in a compression buffer 408 according to each start of row index. Once compressed, the pixel data may then be copied from the compression buffer 410 to an available memory space (e.g., memory buffer 505 in FIG. 5). Although this illustrates the use of data compression using compression buffer 408, it is not intended to be limited in such a manner, since this method of memory allocation may also be used without data compression.

Upon receiving an access request from a memory controller, the memory where the compressed data is stored may be accessed to read out the stored data, so as to reconstruct the acquired image. According to various embodiments of the invention, some image distortion may still remain part of the stored data resulting from non-linearity, such as that associated with a wide angle lens forming a part of an imaging system.

Figure 5:
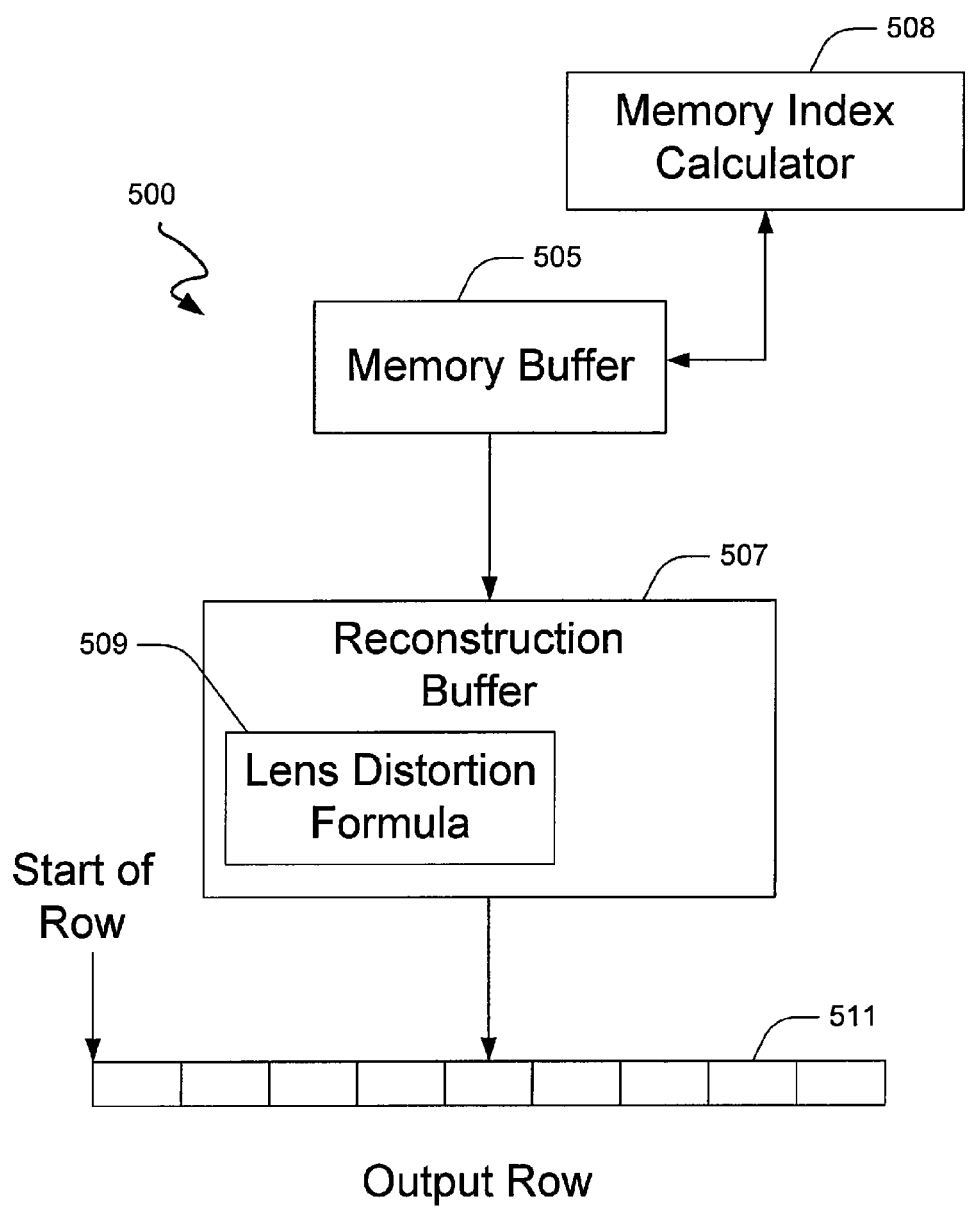
FIG. 5 is a block diagram of an image reconstruction system, according to various embodiments of the invention.

FIG. 5 is a block diagram of an image reconstruction system 500, according to various embodiments of the invention. Data is read out of the memory buffer 505 and assigned coordinates x',y' to be associated with the original data. If compression was used to store the data, a decoder (not shown) may be used to decompress the data. Using a memory index calculator 508, the data can be organized within the reconstruction buffer 507 according to the original array x, y coordinates. Non-linearity existing between consecutive data pixels may then be corrected using a lens distortion formula 509 associated with a known non-linearity, such as that established by a particular wide angle lens used to gather light and focus the image onto the array. The data can then be read out of the reconstruction buffer 507 to a given output such as output row 511. Output row 511 may comprise a series of memory locations, a display, or other form of mechanism that can be used to receive the data. The start of row index can subsequently be used to identify the start of each subsequent row of data pixels while reorganizing the data.

Methods of sensing and acquiring data associated with an imaging device, including an array of camera pixels as described above, may be implemented using a wide variety of electronic devices, such as semiconductor devices, memory, telecommunication systems, wireless systems, and computers. Further some embodiments of electronic devices may be realized as integrated circuits.

Figure 6:
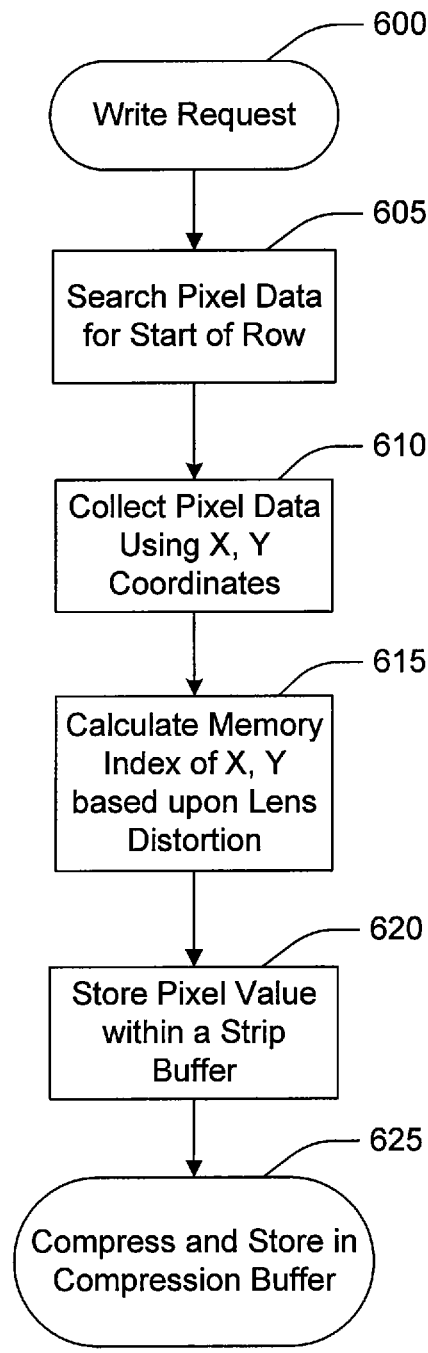
FIG. 6 illustrates a write request according to various embodiments of the invention.

FIG. 6 illustrates a write request according to various embodiments of the invention. At 600, an allocation request associated with a data write is sent by a memory controller. At 605, the pixel data of an array organized in rows and columns is searched top to bottom, left to right until a start of row is found. At 610, pixel data is collected according to its x,y array coordinates and at 615, the memory index of each x,y coordinate is calculated based upon the lens distortion formula. At 620, the pixel data along with a memory index is stored within a strip buffer until the buffer is fall. At 625, the data and memory index contained within the filled strip buffer is compressed and transferred to a compression buffer of memory.

Figure 7:
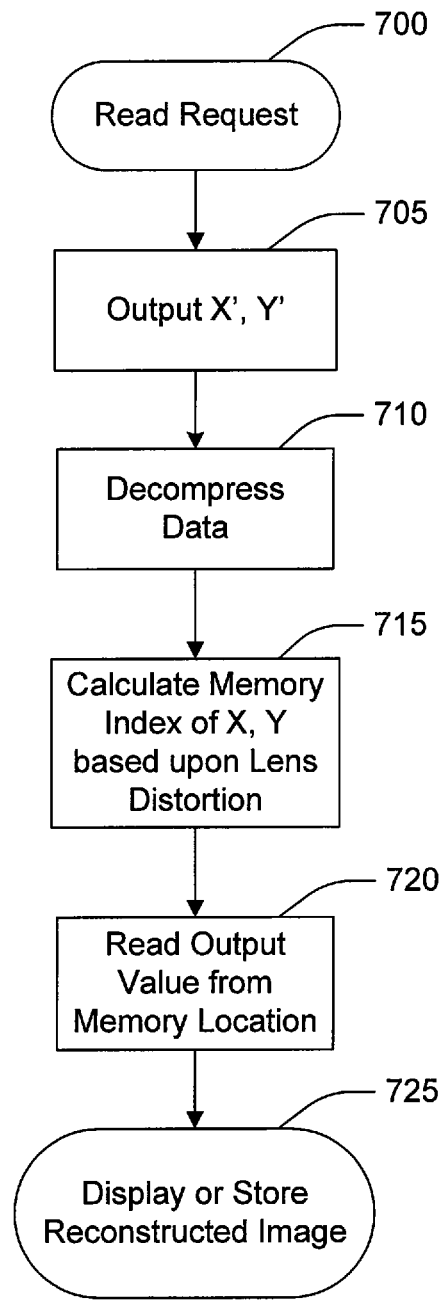
FIG. 7 illustrates a read request according to various embodiments of the invention.

FIG. 7 illustrates a read request according to various embodiments of the invention. At 700, an allocation request associated with a data read request is presented to the memory by a memory controller. At 705 the x',y' values are collected from the stored data. At 710, the compressed data is decoded to uncompress the data. At 715, the memory index associated with the pixel array coordinates x,y is calculated to establish the pixel array x,y coordinates and may also include a distortion correction algorithm based upon the lens distortion. At 720, the associated data for the coordinates x,y located at the calculated memory index location is read out of the memory buffer and repeated for each set of x,y coordinates. At 725, the complete image is reconstructed and can either be displayed or stored in a reconstructed form.

It should be noted that the methods described herein do not have to be executed in the order described, or in any particular order. Moreover, various activities described with respect to the methods identified herein can be executed in iterative, repetitive, serial, or parallel fashion. Information, including parameters, commands, operands, and other data, can be sent and received in the form of one or more carrier waves.

Figure 8:
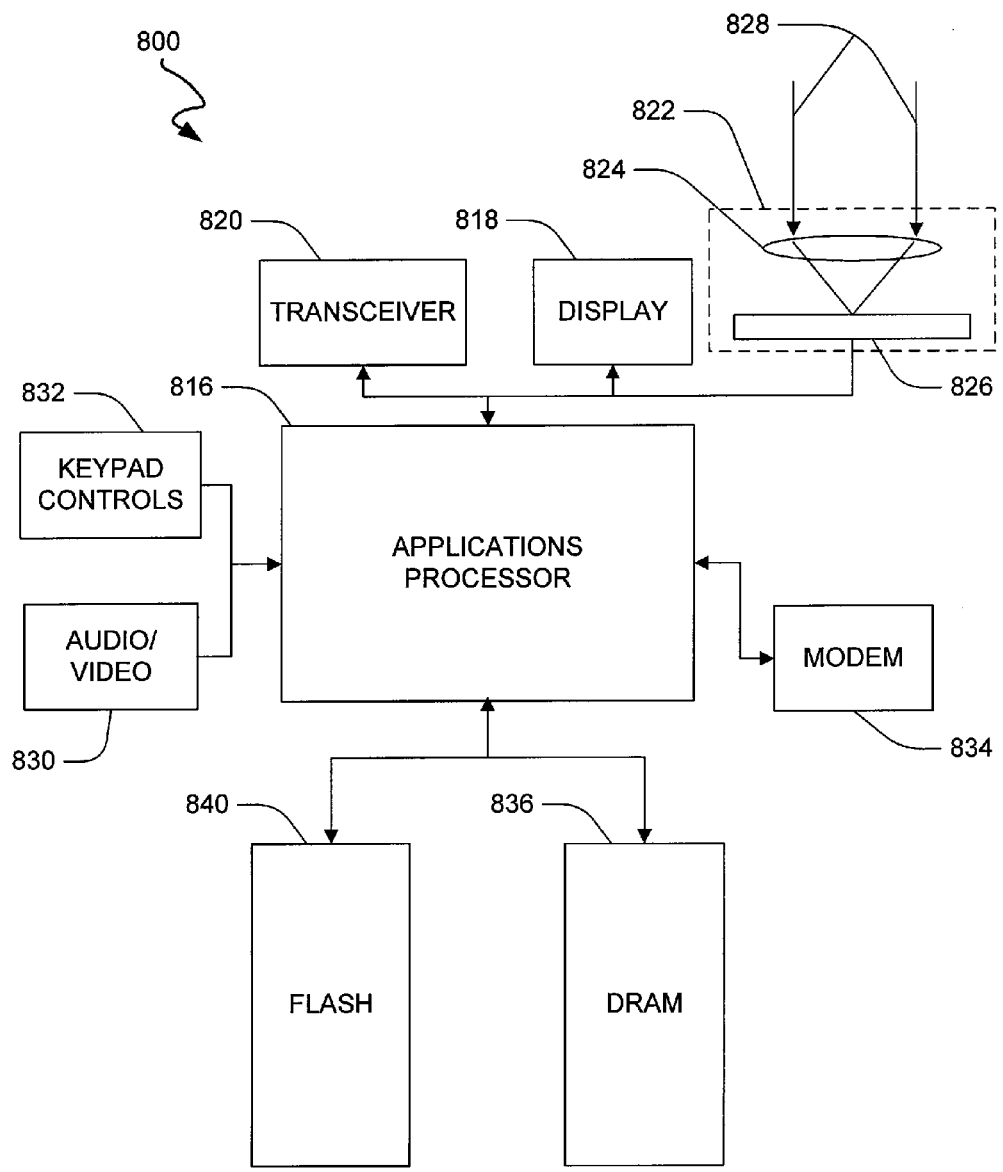
FIG. 8 is a block diagram of a system according to various embodiments of the invention.

FIG. 8 is a block diagram of a system 800 according to various embodiments of the invention. The system 800 may include one or more apparatus, which may be similar to or identical to that of data storage system 100 in FIG. 1. The system 800, in some embodiments, may comprise a processor 816 coupled to a display 818 to display data processed by the processor 816. The system 800 may also include a wireless transceiver 820 (e.g., a cellular telephone transceiver) to receive and transmit data processed by the processor 816.

The memory system(s) included in the apparatus 800 may include dynamic random access memory (DRAM) 836 and non-volatile flash memory 840 coupled to the processor 816. In various embodiments, the system 800 may comprise a camera 822, including a lens 824 and an imaging plane 826 coupled to the processor 816. The imaging plane 826 may be used to receive light rays 828 captured by the lens 824. Images captured by the lens 824 may be stored in the DRAM 836 and the flash memory 840. The lens 824 may comprise a wide angle lens for collecting a large field of view into a relatively small imaging plane 826. In various embodiments, lens 826 may comprise a fish-eye lens which produces non-linearity among consecutive pixels within the imaging plane 826 due to varied sensitivity along its non-uniform surface.

In many embodiments, the imaging plane 826 may be similar to or identical to the arrays 200 and 400 of FIGS. 2, and 4, respectively. The applications processor 816 may include any one or more of the following elements: storage system 100 (FIG. 1); the buffers 406, 410, 505, 507 (FIGS. 4 and 5); the calculators 408, 508 (FIGS. 4 and 5), and the output row 511 (FIG. 5).

Many variations of system 700 are possible. For example, in various embodiments, the system 800 may comprise an audio/video media player 830, including a set of media playback controls 832, coupled to the processor 816. In various embodiments, the system 800 may comprise a modem 834 coupled to the processor 816.

Although specific embodiments have been illustrated and described herein, it will be appreciated by those of ordinary skill in the art that any arrangement which is calculated to achieve the same purpose may be substituted for the specific embodiments shown. This application is intended to cover adaptations or variations of the present subject matter. It is to be understood that the above description is intended to be illustrative, and not restrictive. Combinations of the above embodiments, and other embodiments will be apparent to those of skill in the art upon reviewing the above description. The scope of the present subject matter should be determined with reference to the appended claims, along with the full scope of equivalents to which such claims are entitled.

The examples that are described in the above description provide sufficient detail to enable those skilled in the art to practice the inventive subject matter, and serve to illustrate how the inventive subject matter may be applied to various purposes or embodiments. References to "an", "one", or "various" embodiments in this disclosure are not necessarily to the same embodiment, and such references may contemplate more than one embodiment. Other embodiments may be utilized, and structural, logical, and electrical changes may be made without departing from the scope of the present disclosure. The terms "data" and "information" may be used interchangeably herein.

Such embodiments of the inventive subject matter may be referred to herein individually or collectively by the term "invention" merely for convenience and without intending to voluntarily limit the scope of this application to any single invention or inventive concept, if more than one is in fact disclosed. Thus, although specific embodiments have been illustrated and described herein, any arrangement calculated to achieve the same purpose may be substituted for the specific embodiments shown. This disclosure is intended to cover any and all adaptations or variations of various embodiments.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted to require more features than are expressly recited in each claim. Rather, inventive subject matter may be found in less than all features of a single disclosed embodiment. Thus the following claims are hereby incorporated into the Detailed Description, with each claim standing on its own as a separate embodiment.

What is claimed is:

1. A method comprising:
   receiving an allocation request at a storage device configurable as an array of storage blocks having rows and columns, wherein the array comprises used storage blocks storing non-rectangular data and wherein the array further comprises unused storage blocks;
   receiving a start index associated with the beginning of the array;
   calculating a memory index for at least one storage block within the array using an integral function based upon a shape of a boundary between the used and unused storage blocks; and
   transferring the non-rectangular data from the storage device to a memory device according to the memory index.

2. The method of claim 1, wherein receiving an allocation request is associated with reading the non-rectangular data from the storage device.

3. The method of claim 1, wherein the integral function for each storage block in the array is unique.

4. The method of claim 1, wherein receiving a start index occurs once for each of the rows having the non-rectangular data stored therein.

5. The method of claim 1, wherein the transferring comprises:
copying the non-rectangular data stored in at least two of the rows to a temporary memory cell included in a plurality of memory cells included in the memory device;
compressing the non-rectangular data in the temporary memory cell to provide compressed data; and
storing the compressed data in at least one compression memory cell included in the plurality of memory cells.

6. A method comprising:
receiving an allocation request from a processor configured to manage data communicated between a memory device comprising a plurality of memory cells and a storage device configurable as an array of storage blocks having rows and columns, wherein the array comprises used storage blocks storing the data and wherein the array further comprises unused storage blocks;
identifying at least one of the rows and the columns having a portion of the data stored therein;
searching for a start index associated with the at least one of the rows and the columns;
calculating a memory index using an integral function based upon a shape of a boundary between the used storage blocks and the unused storage blocks; and
transferring the data according to the memory index from the storage blocks to the plurality of memory cells.

7. The method of claim 6, wherein receiving an allocation request is associated with reading data from the memory device.

8. The method of claim 6, wherein the start index is included only once for each row of data to be transferred.

9. The method of claim 6, wherein the transferring comprises:
copying the data contained in the at least one memory cell to a temporary memory block;
decompressing the data contained in the temporary memory block; and
storing the decompressed data in two or more rows of the storage device.

10. A method comprising:
searching for a start index associated with a selected row of pixels forming a portion of a pixel array having rows and columns after a beginning of an integration time associated with acquiring an image, wherein the pixel array comprises a first set of pixels storing useful data and a second set of pixels storing non-useful data;
transferring the useful data from at least the selected row of pixels to a temporary block included in a plurality of memory cells;
calculating a memory index based on a shape of a boundary between the first set of pixels and the second set of pixels;
compressing the useful data stored within the temporary block to provide compressed data; and
writing the compressed data according to the memory index to a compression buffer included in the plurality of memory cells.

11. The method of claim 10, wherein the shape of the boundary is at least partially represented by a polynomial function.

12. The method of claim 10, wherein writing the compressed data occurs after an end of the integration time.

13. An apparatus comprising:
a sensor module configurable as a plurality of storage blocks having rows and columns, wherein the plurality of storage blocks comprises used storage blocks storing data and wherein the plurality of storage blocks further comprises unused storage blocks; and
a memory device to couple to the sensor module, the memory device including a memory block comprising a plurality of memory cells to store data received from the plurality of storage blocks, wherein the plurality of storage blocks are associated with the plurality of memory cells using a memory index calculated based upon a shape of a boundary between the used storage blocks and the unused storage blocks.

14. The apparatus of claim 13, wherein the plurality of memory cells are configurable as a temporary memory block that stores the data from at least two storage blocks of the sensor module and a compression memory block that stores compressed data, wherein the data stored within at least two of the memory cells of the temporary memory block are to be compressed and stored within at least one of the memory cells of the compression memory block according to the memory index.

15. The apparatus of claim 13, wherein the sensor module comprises:
an array of pixels.

16. The apparatus of claim 15, wherein the array of pixels comprises at least one row of pixels, wherein the at least one row of pixels has an associated start of row index, and wherein the start of row index indicates a first used storage block in a given row of the storage blocks.

17. The apparatus of claim 15, comprising:
a calculator module coupled to the array of pixels and the temporary memory block, the calculator module configurable as an index calculator to calculate the memory index.

18. The apparatus of claim 13, comprising:
a processor coupled to the sensor module to manage transferring the data between the sensor module and the memory device within an integration time associated with the sensor module.

19. A system comprising:
a lens;
a sensor module to store data associated with an image captured by the lens, the sensor module including a controller and comprising an array of storage blocks organized as rows and columns, wherein the array comprises used storage blocks storing the data and wherein the array further comprises unused storage blocks and wherein at least one storage block in each of the rows and the columns includes a start index to identify a location of at least one of the used storage blocks; and
a memory device to couple to the sensor module, the memory device including a plurality of memory cells configurable to store the data, wherein the plurality of memory cells comprises a first set of memory cells and a second set of memory cells, wherein the second set of memory cells forms a compression buffer, wherein the data stored in the first set of memory cells is to be compressed and stored in the compression buffer according to a memory index, and wherein the memory index is calculated based upon a shape of a boundary between the used storage blocks and the unused storage blocks.

20. The system of claim 19, wherein the sensor module comprises:
an imaging device to store the data in the storage blocks, the data comprising a representation of the image as distorted by the lens.

21. The system of claim 19, wherein the memory index is determined in part by a shape of the lens.

22. The system of claim 19 comprising:
a cellular telephone transceiver to transmit a portion of the data.

23. The system of claim 19 comprising:
a media player and a keypad control module to couple to the controller.

24. The system of claim 19 comprising:
a display device to couple to the controller and to display a portion of the data.

25. The system of claim 19 comprising:
a flash memory device to couple to the controller and to store a portion of the data.

26. A method of operating a memory system comprising:
acquiring a portion of an image from a lens as image portion data using an imaging device during an integration time associated with the imaging device, wherein the imaging device comprises a first set of pixels storing the image portion data and a second set of pixels storing non-useful data;
calculating a memory index based upon a shape of a boundary between the first set of pixels and the second set of pixels;
transferring the image portion data according to the memory index from the first set of pixels in the imaging device to a plurality of memory cells in response to receiving an allocation request from a controller;
reconstructing the image portion data from the plurality of memory cells to provide a reconstructed image portion in response to receiving an allocation request from the controller, wherein reconstructing the image portion data comprises retrieving the image portion data from the plurality of memory cells using the memory index and correcting non-linearity in the image portion data using a lens distortion formula; and
storing the reconstructed image portion within a flash memory device.

27. The method of claim 26, wherein the plurality of memory cells includes a first set of memory cells that form a temporary buffer and a second set of memory cells that form a compression buffer and wherein transferring the image portion data comprises:
copying the image portion data from the first set of pixels in the imaging device to the temporary buffer;
compressing the image portion data within the temporary buffer to provide compressed data; and
transferring the compressed data to the compression buffer.

28. The method of claim 26, further comprising:
displaying the reconstructed image portion on a display device.

* * * * *